US011858444B2

United States Patent
Yamazaki

(10) Patent No.: US 11,858,444 B2
(45) Date of Patent: Jan. 2, 2024

(54) OCCUPANT PROTECTION DEVICE

(71) Applicant: DAICEL CORPORATION, Osaka (JP)

(72) Inventor: Masayuki Yamazaki, Tokyo (JP)

(73) Assignee: Daicel Corporation, Tokyo (JP)

(*) Notice: Subject to any disclaimer, the term of this patent is extended or adjusted under 35 U.S.C. 154(b) by 0 days.

(21) Appl. No.: 17/570,755

(22) Filed: Jan. 7, 2022

(65) Prior Publication Data
US 2022/0126774 A1 Apr. 28, 2022

Related U.S. Application Data

(63) Continuation of application No. PCT/JP2020/025039, filed on Jun. 25, 2020.

(30) Foreign Application Priority Data

Jul. 12, 2019 (JP) .................... 2019-130316

(51) Int. Cl.
*B60R 21/04* (2006.01)
*B60R 21/05* (2006.01)
(Continued)

(52) U.S. Cl.
CPC .............. *B60R 21/04* (2013.01); *B60R 21/05* (2013.01); *B60R 21/08* (2013.01); *B60R 21/203* (2013.01);
(Continued)

(58) Field of Classification Search
CPC ....... B60R 21/04; B60R 21/045; B60R 21/05; B60R 21/203; B60R 21/205;
(Continued)

(56) References Cited

U.S. PATENT DOCUMENTS 1,548,870 A * 8/1925 Crafton .................. B60R 21/02
297/488
3,370,886 A * 2/1968 Frost ...................... B60R 21/06
280/730.1
(Continued)

FOREIGN PATENT DOCUMENTS

JP 01132443 A * 5/1989
JP 2005-145179 A 6/2005
(Continued)

OTHER PUBLICATIONS

International Search Report dated Aug. 4, 2020, issued in counterpart Application No. PCT/JP2020/025039, with English translation. (7 pages).
(Continued)

*Primary Examiner* — Laura Freedman
(74) *Attorney, Agent, or Firm* — WHDA, LLP

(57) ABSTRACT

The occupant protection device that protects an occupant boarding on a vehicle and includes: a base portion fixed to the vehicle; an operation portion connected to the base portion and configured to move back and forth between a first position serving as an initial position and a second position used to suppress movement of the occupant when inertial force acts on the occupant; and a control unit configured to perform movement control to move the operation portion from the first position to the second position. The operation portion is movable repeatedly from the first position to the second position through the movement control by returning to the first position after having moved from the first position to the second position. The occupant protection device includes an buffering means configured to buffer a collision impact on the occupant against the operation portion when the operation portion moves to the second position.

10 Claims, 12 Drawing Sheets

(51) Int. Cl.
  *B60R 21/08* (2006.01)
  *B60R 21/203* (2006.01)
  *B62D 1/11* (2006.01)
  *B60R 21/205* (2011.01)
  *B60R 21/06* (2006.01)

(52) U.S. Cl.
  CPC .............. *B60R 21/205* (2013.01); *B62D 1/11* (2013.01); *B60R 2021/0442* (2013.01); *B60R 2021/065* (2013.01)

(58) Field of Classification Search
  CPC .... B60R 2021/0226; B60R 2021/0233; B60R 2021/024; B60R 2021/0273; B60R 2021/0407; B60R 2021/165; B62D 1/11
  See application file for complete search history.

(56) References Cited

U.S. PATENT DOCUMENTS

| | | | | |
|---|---|---|---|---|
| 3,767,229 A | * | 10/1973 | Cain | B60R 21/16 280/743.1 |
| 3,782,492 A | * | 1/1974 | Hollins | B60R 21/02 280/753 |
| 4,951,963 A | * | 8/1990 | Behr | B60R 21/01536 280/752 |
| 5,131,681 A | * | 7/1992 | Wetzel | B60R 21/02 280/801.1 |
| 6,641,166 B2 | * | 11/2003 | Browne | B60R 21/045 280/752 |
| 7,048,298 B2 | * | 5/2006 | Arwood | B60R 21/206 280/752 |
| 7,188,867 B2 | | 3/2007 | Gatti et al. | |
| 7,441,624 B2 | * | 10/2008 | Tobata | B60R 21/013 701/45 |
| 7,494,152 B2 | * | 2/2009 | Schuler | B60R 21/01516 280/752 |
| 7,552,943 B2 | * | 6/2009 | Pal | B60R 21/045 280/751 |
| 7,584,995 B2 | * | 9/2009 | Iwasaki | B60R 21/02 280/752 |
| 8,899,623 B2 | * | 12/2014 | Stadler | B62D 5/001 280/775 |
| 9,828,016 B2 | * | 11/2017 | Lubischer | B62D 1/183 |
| 2008/0114516 A1 | * | 5/2008 | Jackson | B60R 21/0428 280/736 |
| 2017/0334383 A1 | | 11/2017 | Paxton et al. | |
| 2018/0290614 A1 | | 10/2018 | Paxton et al. | |

FOREIGN PATENT DOCUMENTS

| | | |
|---|---|---|
| JP | 2008006953 A * | 1/2008 |
| JP | 2010-202121 A | 9/2010 |
| JP | 2019-516605 A | 6/2019 |

OTHER PUBLICATIONS

Written Opinion dated Aug. 4, 2020, issued in counterpart Application No. PCT/JP2020/025039, with English translation. (6 pages).

* cited by examiner

OCCUPANT PROTECTION DEVICE

TECHNICAL FIELD

The present disclosure relates to an occupant protection device that protects an occupant boarding on a vehicle.

BACKGROUND ART

In the related art, there has been known a technique for protecting an occupant boarding on a vehicle. For example, Patent Document 1 describes an energy storing device. When an occupant collides against a steering wheel, the energy storing device protects the occupant by reducing reaction force acting on the occupant. When force is applied on the front side of the steering shaft in the axial direction, this energy storing device adjusts the magnitude of force reacting against this applied force to reduce reaction force acting on the occupant.

CITATION LIST

Patent Documents

Patent Document 1: U.S. Pat. No. 7,188,867

SUMMARY OF INVENTION

Technical Problem

Incidentally, when a vehicle suddenly decelerates or the like and inertial force acts on an occupant, the occupant may collide against a steering wheel or other structures in the vehicle or the like. In such a case, acceleration is generated at the occupant due to inertial force, which may result in the occupant colliding against the structures or the like at a velocity greater than the initial velocity. In a case where the occupant collides against structures in the vehicle at a relatively greater velocity, the reaction force acting on the occupant increases at the time of collision, which may result in the occupant being not able to be protected.

The present disclosure has been made in view of the problem described above, and an object of the present disclosure is to provide an occupant protection device that can protect an occupant and can be repetitively used.

Solution to Problem

In order to solve the problem described above, the present disclosure employs an operation portion that can move back and forth between a first position serving as an initial position and a second position used to suppress movement of an occupant when inertial force acts on the occupant. Such an operation portion enables movement of an occupant to be suppressed at the second position, making it possible to restrain and protect the occupant.

Specifically, the present disclosure provides an occupant protection device that protects an occupant boarding on a vehicle, the occupant protection device including: a base portion fixed to the vehicle; an operation portion connected to the base portion and configured to move back and forth between a first position serving as an initial position and a second position used to suppress movement of the occupant when inertial force acts on the occupant; and a control unit configured to perform movement control that causes the operation portion to move from the first position to the second position, in which the operation portion is movable repeatedly from the first position to the second position through the movement control by returning to the first position after having moved from the first position to the second position. The occupant protection device further includes an buffering means configured to buffer a collision impact on the occupant against the operation portion when the operation portion moves to the second position.

The occupant protection device according to the present disclosure uses the operation portion that is moved to the second position, thus suppressing movement of the occupant when inertial force acts on the occupant. With this configuration, the occupant protection device can suppress movement of the occupant at the second position, where a movement velocity of the occupant when inertial force acts is relatively small, while preventing the occupant from colliding against structures in the vehicle, making it possible to favorably protect the occupant. In addition, the occupant protection device includes an buffering means configured to buffer the collision impact on the occupant against the operation portion when the operation portion suppresses movement of the occupant. With this configuration, the occupant protection device can reduce the collision impact of the occupant against the operation portion, making it possible to more reliably protect the occupant.

In the occupant protection device described above, the control unit may perform the movement control in a case of acquiring information indicating that the vehicle suddenly decelerates or the inertial force acts on the occupant and causes the occupant to move. In this manner, the control unit performs the movement control in either detection of sudden deceleration of a vehicle or detection of inertial force acting on the occupant and causing the occupant to move. This enables the occupant protection device to protect the occupant.

In the occupant protection device described above, the operation portion may include an airbag attached at a position that faces the occupant in a case of having moved to the second position. The occupant protection device may further include a gas generator configured to supply gas to the airbag. In addition, the control unit may activate the gas generator to supply gas to the airbag at the time of performing the movement control. In this manner, the control unit may activate the gas generator at the time of performing the movement control of the operation portion to inflate the airbag. With the occupant protection device, it is possible to inflate the airbag at the second position where the operation portion is closer to the occupant than at the first position. This enables the volume of the airbag to reduce, making it possible to reduce the size of the airbag device including the airbag and the gas generator.

In the occupant protection device, in a case where the control unit determines a distance between the operation portion at the second position and the occupant is less than a predetermined distance, the control unit may not activate the gas generator at the time of performing the movement control. This is because, in a case where the distance between the operation portion and the occupant is less than a predetermined distance, it is conceived that the occupant is potentially in danger if the airbag is inflated. In a case of an occupant protection device 1, the occupant is appropriately protected by not inflating the airbag.

In the occupant protection device described above, the operation portion may catch a part of a body of the occupant at the second position to suppress the movement of the occupant. In addition, when the operation portion catches the part of the body of the occupant, the buffering means may reduce reaction force associated with the inertial force acting on the occupant. Here, the part of the body of the occupant that the operation portion catches includes a head. However, the occupant protection device is not limited to this. The operation portion may be disposed and thus catch the chest, the abdomen, the arm, the leg, or the like of the occupant.

In the occupant protection device described above, the control unit may control adjustment of the reaction force by the buffering means, in accordance with a velocity of the vehicle, a weight of the occupant, or in accordance with a velocity of the occupant toward the operation portion in a case where the inertial force acts.

In the occupant protection device described above, the operation portion may include a catching portion made of an elastic member and configured to catch the part of a body of the occupant at the second position, and the buffering means may absorb kinetic energy of the occupant and reduces the reaction force, when the catching portion catches the part of the body of the occupant.

In the occupant protection device described above, the operation portion may be a steering wheel. The occupant protection device may further include a steering shaft configured to connect the steering wheel and the base portion. At the time of the kinetic energy of the occupant to act on the steering shaft when the steering wheel catches the part of the body of the occupant, the buffering means may adjust resistance force thereof to reduce the reaction force.

In the occupant protection device described above, in a case of determination that the vehicle is expected to collide against an obstruction, based on environment information on the vehicle detected by a sensor mounted at the vehicle, the control unit may perform the movement control before collision against the obstruction. In this manner, in a case where the vehicle is expected to collide against an obstruction, the occupant protection device may perform the movement control. With this configuration, the occupant protection device can perform the movement control before inertial force acts on the occupant due to collision of or sudden deceleration of the vehicle, making it possible to move the operation portion to the second position before the occupant starts to move due to the inertial force. Thus, the occupant protection device can suppress movement of the occupant using the operation portion when the initial velocity of the occupant is relatively small, making it possible to cause reaction force that the occupant receives from the operation portion to be relatively small, which in turn makes it possible to favorably protect the occupant.

Advantageous Effects of Invention

According to a technique of the present disclosure, it is possible to achieve repetitive use while protecting an occupant.

DESCRIPTION OF EMBODIMENTS

Below, an occupant protection device according to embodiment of the present disclosure will be described with reference to the drawings. Note that each of the configurations, combinations thereof, and the like in each embodiment is an example, and additions, omissions, substitutions, and other changes of the configuration may be made as appropriate without departing from the spirit of the present invention. The embodiment is not given for the purpose of limiting the present invention, and the present invention is limited only by the scope of claims.

First Embodiment

An occupant protection device according to a first embodiment will be described. The occupant protection device is mounted to a vehicle for a purpose of protecting an occupant boarding on the vehicle such as an automobile. Note that, in the following description, a front side of a vehicle with respect to the occupant is relatively referred to as "front," "front side," or "frontward."; a rear side of the vehicle is relatively referred to as "rear," "rear side," or "rearward."; a left side as viewed from the rear side to the front side is relatively referred to as "left," "left side," or "leftward."; and a right side as viewed from the rear side to the front side is relatively referred to as "right," "right side," or "rightward."

Figure 1A:
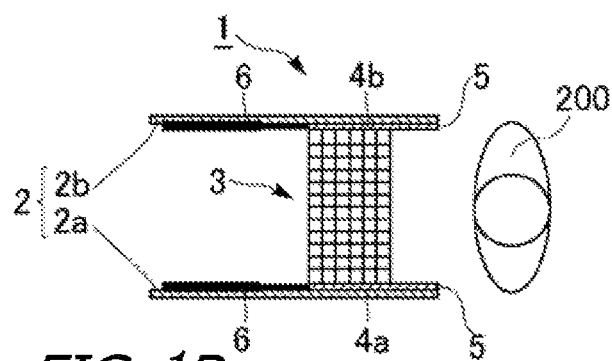
FIG. 1A is a first diagram illustrating an occupant protection device according to a first embodiment.
Figure 1B:
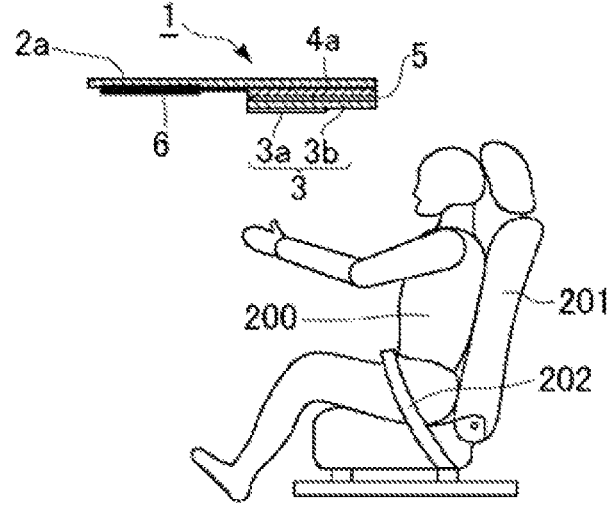
FIG. 1B is a first diagram illustrating an occupant protection device according to a first embodiment.

FIG. 1A is a diagram schematically illustrating a state of an occupant protection device 1 as viewed from above a vehicle. FIG. 1B is a diagram schematically illustrating a state of the occupant protection device 1 as viewed from the left side of the vehicle. In FIGS. 1A and 1B, an occupant 200 boards on the vehicle in a state of sitting on a seat 201 provided within the vehicle. Note that the seat 201 is disposed within the vehicle in a manner such that the sitting occupant 200 faces frontward of the vehicle. In addition, the seat 201 includes a seatbelt 202 configured to restrain a hypogastric region of the occupant 200. The occupant 200 has one's hypogastium restrained by the seatbelt 202 with respect to the seat 201. Note that the seatbelt 202 may be configured to not only restrain the hypogastric region of the occupant but also restrain the upper body of the occupant.

As illustrated in FIG. 1A, the occupant protection device 1 includes a base portion 2 fixed to the vehicle. The base portion 2 is fixed to a structure (for example, a body or frame) that constitutes the vehicle. In a case of the present embodiment, the base portion 2 is fixed to a ceiling portion of the body of the vehicle, and includes a left side base 2a and a right side base 2b that form a pair and extend in a front and rear direction of the vehicle. The left side base 2a and the right side base 2b are disposed in a manner such that they are opposite each other with a space (approximately 40 cm) of approximately the shoulder width of a typical adult being given between the left side base 2a and the right side base 2b.

Furthermore, the occupant protection device 1 includes an operation portion 3. The operation portion 3 is provided to suppress movement of the occupant 200 when inertial force acts. The operation portion 3 is connected to the base portion 2 through a slide portion 4a attached to the left side base 2a in a slidable manner, and also through a slide portion 4b attached to the right side base 2b in a slidable manner. The slide portion 4a is guided with a guiding groove (not illustrated) provided at the left side base 2a, and can slide in a frontward direction along the left side base 2a from a state illustrated in FIGS. 1A and 1B. In a similar manner, the slide portion 4b is guided with a guiding groove (not illustrated) provided at the right side base 2b, and can slide in a frontward direction along the right side base 2b from the state illustrated in FIGS. 1A and 1B. Note that a stopper (not illustrated) is provided at the guiding groove of each of the left side base 2a and the right side base 2b such that the slide portion 4a or 4b does not slide beyond the rear end portion of each of the left side base 2a and the right side base 2b. The slide portions 4a and 4b are each urged rearward using an elastic member or the like in a manner such that, before the occupant protection device 1 is activated, each rear end portion thereof is at rest at a position that aligns with the rear end of each of the left side base 2a and the right side base 2b.

The operation portion 3 is connected to the slide portions 4a and 4b through a hinge 5, and can move in a rotational manner with the hinge 5 being the center. In a state illustrated in FIGS. 1A and 1B, the operation portion 3 is disposed at a first position serving as an initial position. The first position is a position where the operation portion 3 is stored before the occupant protection device 1 is activated. The operation portion 3 includes a front-side end portion fixed to the slide portion 4a, 4b using a fastening fixture (not illustrated), and is fixed at the first position in a state before activation such that the operation portion 3 does not move in a rotational manner to a second position due to the gravity (see, for example, FIGS. 2A and 2B). At the time of activation, the occupant protection device 1 uses, for example, a solenoid or the like, to move the fastening fixture used to fix the operation portion 3 at the first position to put the fastening fixture off the operation portion 3, which enables the operation portion 3 to move to the second position.

In addition, the operation portion 3 can move back and forth between the first position and the second position used to suppress movement of the occupant 200 when inertial force acts on the occupant 200. Furthermore, the operation portion 3 moves from the first position to the second position and then returns to the first position. Thus, the operation portion 3 can repeatedly move from the first position to the second position. With the present embodiment, the operation portion 3 is connected to the base portion 2 in a manner that the operation portion 3 can move back and forth between the first position and the second position.

In addition, as illustrated in FIG. 1B, the operation portion 3 includes a catching portion 3a configured to catch the occupant 200 when inertial force acts on the occupant 200, and also includes a frame portion 3b configured to connect the catching portion 3a to the slide portions 4a and 4b. The catching portion 3a is comprised of an elastic member, and catches a portion (the head in the present embodiment) of a body of the occupant. The elastic member used for the catching portion 3a includes, for example, a net, a cloth, resin, or the like. Note that resin that plastically deforms may be used for the catching portion 3a. The catching portion 3a is attached to the frame portion 3b disposed at each of left and right end sides of the catching portion 3a. The frame portion 3b on the left side is connected to the slide portion 4a through the hinge 5 on the left side. The frame portion 3b on the right side (not illustrated) is connected to the slide portion 4b through the hinge 5 on the right side.

The occupant protection device 1 further includes a damper device 6 (one example of the buffering means) configured to buffer a collision impact on the occupant 200 against the operation portion 3 when the operation portion 3 moves to the second position. The damper device 6 is fixed to each of the left side base 2a and the right side base 2b on more of a front side than the slide portions 4a and 4b, and absorbs kinetic energy when the slide portions 4a and 4b slide frontward. Note that the damper device 6 may be disposed in a manner such that the damper device 6 exists between the slide portion 4a, 4b and each of the left side base 2a and the right side base 2b. The damper device 6 absorbs the kinetic energy of the occupant 200 which causes the operation portion 3 and the slide portions 4a and 4b to slide frontward due to inertial force acting on the occupant 200, when the occupant 200 collides against the operation portion 3. This reduces reaction force associated with the inertial force acting on the occupant 200 when the operation portion 3 catches a portion of the body of the occupant 200. Note that it is only necessary that the buffering means can reduce the reaction force by absorbing the kinetic energy, and an elastic member such as a spring may be used.

Figure 2A:
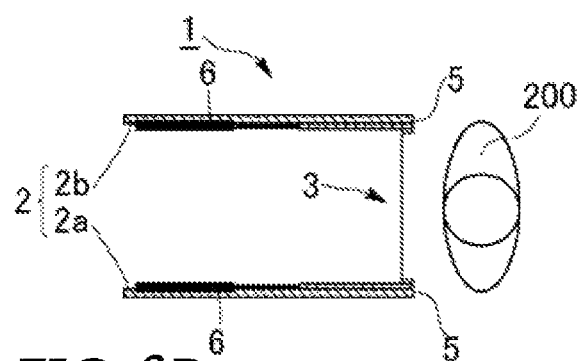
FIG. 2A is a second diagram illustrating the occupant protection device according to the first embodiment.
Figure 2B:
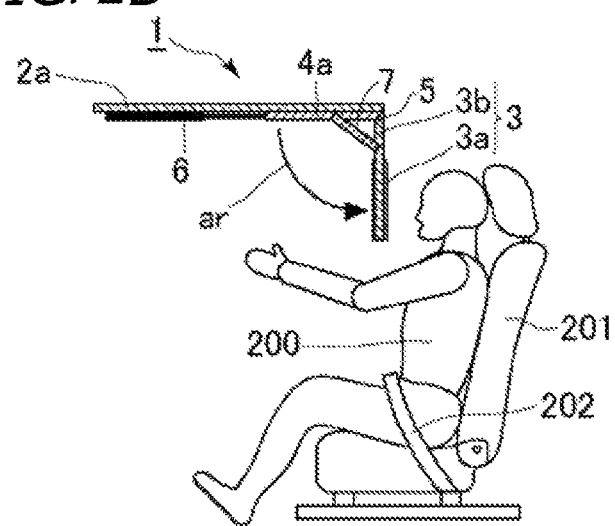
FIG. 2B is a second diagram illustrating the occupant protection device according to the first embodiment.

FIGS. 2A and 2B are schematic diagrams illustrating a state where the operation portion 3 moves to the second position. FIG. 2A is a diagram schematically illustrating a state of the occupant protection device 1 as viewed from above the vehicle. FIG. 2B is a diagram schematically illustrating a state of the occupant protection device 1 as viewed from the left side of the vehicle.

In a case of detecting a signal indicating that the vehicle suddenly decelerates or inertial force acts on the occupant 200 and causes the occupant 200 to move, the occupant protection device 1 performs movement control that causes the operation portion 3 to move from the first position to the second position. Details of this movement control will be described later. Note that an arrow ar in FIG. 2B indicates that the operation portion 3 moves in a rotational manner from the first position to the second position with the hinge 5 being the center. In the state illustrated in FIGS. 2A and 2B, the operation portion 3 is disposed at the second position used to suppress movement of the occupant 200 when inertial force acts on the occupant 200. In the present embodiment, at the second position, a predetermined space is provided between the catching portion 3a of the operation portion 3 and the occupant 200 sitting at the seat 201. Note that the second position may be a position where the catching portion 3a and the occupant 200 sitting at the seat 201 are in contact with each other.

Furthermore, as illustrated in FIG. 2B, the occupant protection device 1 may include a supporting bar 7 configured to support the operation portion 3 that has moved to the second position. The occupant protection device 1 includes the supporting bar 7 configured to connect the frame portion 3b on the left side of the operation portion 3 and the slide portion 4a, and also includes a supporting bar (not illustrated) configured to connect the frame portion on the right side of the operation portion 3 and the slide portion 4b.

Figure 3A:
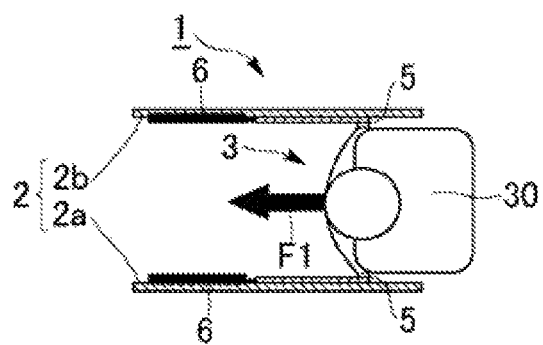
FIG. 3A is a third diagram illustrating the occupant protection device according to the first embodiment.
Figure 3B:
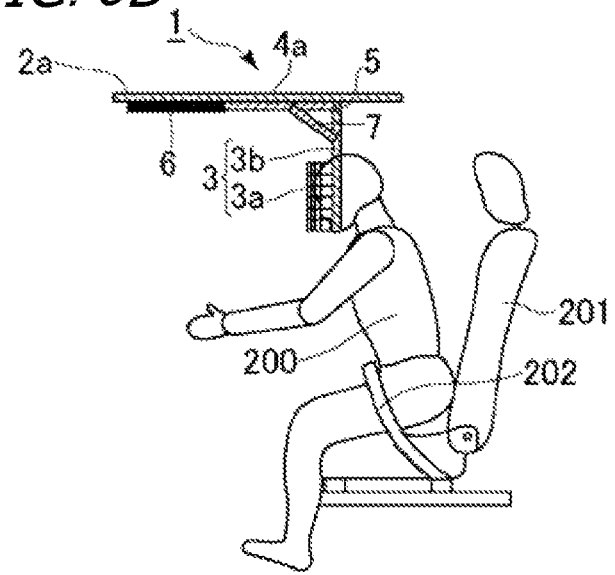
FIG. 3B is a third diagram illustrating the occupant protection device according to the first embodiment.

FIGS. 3A and 3B illustrate a state where inertial force F1 (not illustrated in FIG. 3B) acts on the occupant 200. FIG. 3A is a diagram schematically illustrating a state of the occupant protection device 1 as viewed from above the vehicle. FIG. 3B is a diagram schematically illustrating a state of the occupant protection device 1 as viewed from the left side of the vehicle.

In FIGS. 3A and 3B, the catching portion 3a of the operation portion 3 catches the head of the occupant 200. The occupant protection device 1 according to the present embodiment moves the operation portion 3 to the second position when the inertial force F1 acts on the occupant 200, making it possible to suppress movement of the occupant 200. In addition, the inertial force F1 acts on the occupant 200, which leads to collision of the occupant 200 against the catching portion 3a to cause the operation portion 3 and the slide portion 4a and 4b to slide frontward. The damper device 6 absorbs kinetic energy of the occupant 200 when the catching portion 3a catches the head of the occupant 200, thus reducing reaction force associated with the inertial force F1 acting on the occupant 200. This enables the occupant protection device 1 according to the present embodiment to protect the occupant.

Figure 4:
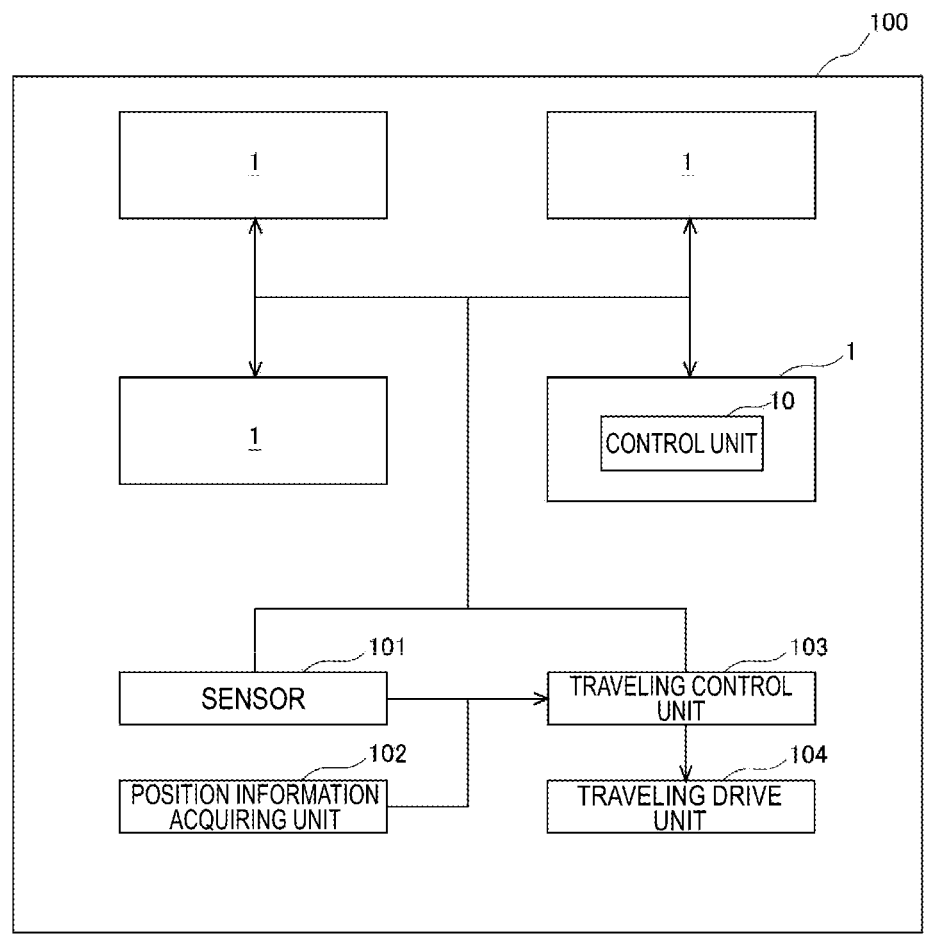
FIG. 4 is a block diagram illustrating an occupant protection device.

Next, the movement control of the operation portion 3 with the occupant protection device 1 described above will be described with reference to FIGS. 4 and 5. FIG. 4 is a block diagram illustrating the occupant protection device 1. In the present embodiment, four seats 201 described above are disposed in a vehicle 100 having the occupant protection devices 1 mounted therein. Each of the occupant protection devices 1 is disposed for each of the seats 201. In FIG. 4, four of the occupant protection devices 1 are illustrated, and functional portions of one of the occupant protection devices 1 are illustrated as representatives. The occupant protection device 1 includes a control unit 10. The control unit 10 is comprised, for example, of a microcomputer, and performs each process by causing a central processing unit (CPU) (not illustrated) to execute a program stored in a storage means (for example, a read only memory (ROM), and is not illustrated).

Furthermore, in FIG. 4, a sensor 101, a position information acquiring unit 102, a traveling control unit 103, and a traveling drive unit 104, each of which is mounted at the vehicle 100, are also illustrated. First, these configurations associated with the vehicle 100 will be described. The vehicle 100 can perform self-driving for traveling on the road in an appropriate manner as autonomous traveling while sensing its periphery. Note that the vehicle 100 can be also manually driven by a passenger. The sensor 101 is a means of performing sensing of the periphery of the vehicle 100 to acquire information necessary for autonomous traveling of the vehicle 100, and is typically configured to include a stereo camera, laser scanner. LIDAR, radar, or the like. The information acquired through the sensor 101 is transmitted to the traveling control unit 103, and is used by the traveling control unit 103 for recognition of obstacles, pedestrians, and traveling lanes present at the periphery of the vehicle 100. In the present embodiment, the sensor 101 may include a visible-light camera or infrared light camera for monitoring. In addition, the position information acquiring unit 102 is a means of acquiring the current position of the vehicle 100, and is typically configured to include a GPS receiver or the like. The information acquired through the position information acquiring unit 102 is also transmitted to the traveling control unit 103, and for example, is used for predetermined processing, such as calculation of a route for the vehicle 100 to reach the destination using the current position of the vehicle 100, calculation of the required time necessary to reach the destination, and the like.

The traveling control unit 103 is a computer configured to control the vehicle 100 on the basis of information acquired from the sensor 101 and the position information acquiring unit 102. The traveling control unit 103 is configured, for example, by a microcomputer, and functions for performing the various processes described above are realized by causing a central processing unit (CPU) (not illustrated) to execute a program stored in a storage means (read only memory (ROM) or the like (not illustrated)).

Specific examples of various processes by the traveling control unit 103 include, for example: a generation process of the travel plan of the vehicle 100, a detection process of the predetermined data of the periphery of the vehicle 100 necessary for autonomous traveling based on the data acquired through the sensor 101; and a generation process of control command for controlling autonomous travel on the basis of the travel plan, the predetermined data, and the position information on the vehicle 100 acquired through the position information acquiring unit 102. The generation process of the travel plan is a process for determining a travel path for reaching a destination from the departure place. Furthermore, the detection process of the predetermined data is, for example, a process for detecting the number and position of lanes, the number and position of other vehicles present in the periphery of the vehicle 100, the number and position of obstructions present in the periphery of the vehicle 100 (for example, pedestrians, bicycles, structures, buildings, and the like), the structure of the road, the road sign, and the like. In addition, the control command described above is transmitted to the traveling drive unit 104, which will be described later. A known method can be used for a method for generating a control command for autonomous traveling of the vehicle 100.

The traveling drive unit 104 is a means of causing the vehicle 100 to travel on the basis of the control command generated by the traveling control unit 103. The traveling drive unit 104 is configured, for example, to include a motor, an engine, an inverter, a brake, a steering mechanism, and the like for driving wheels, and autonomous traveling of the vehicle 100 is achieved by causing the motor, the brake, or the like to drive in accordance with a control command.

Figure 5:
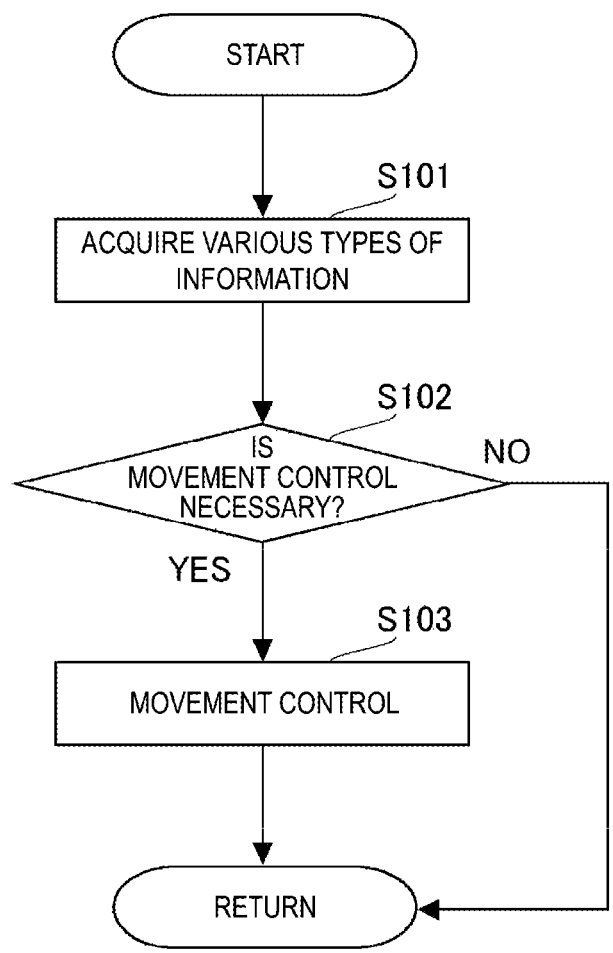
FIG. 5 is a flowchart concerning a process performed by a control unit of the occupant protection device.

Next, details of the movement control will be described with reference to FIG. 5. FIG. 5 is a flowchart concerning processes performed by the control unit 10. Note that this process is repeatedly performed at predetermined intervals by the control unit 10. First, in S101, the control unit 10 acquires various types of information. Various types of information are transmitted from the traveling control unit 103.

Next, in S102, the control unit 10 determines whether or not the movement control is necessary. Upon determination that various types of information acquired in S101 contain information indicating that the vehicle 100 suddenly decelerates, the control unit 10 determines that the movement control is necessary.

Upon determining in S102 that the movement control is necessary, the control unit 10 performs a process of S103. In S103, the control unit 10 performs the movement control. For example, the control unit 10 controls a drive unit configured to drive the operation portion 3, the drive unit including a solenoid, a motor, a hydraulic device, a gas generator, or the like, thus performing the movement control. Note that it may be possible to employ a configuration in which the occupant protection device 1 does not include such a drive unit, and performs a movement control in which the operation portion 3 is urged from the slide portions 4a and 4b toward the bottom side using a compression coil spring or the like, and the control unit 10 causes a fastening fixture used to fasten the operation portion 3 to the slide portions 4a and 4b to move using a solenoid or the like to detach the fastening fixture from the operation portion 3, whereby the operation portion 3 is moved to the second position.

Upon sensing a rapid deceleration, the occupant protection device 1 according to the present embodiment causes the operation portion 3 to move to the second position. With the occupant protection device 1, the operation portion 3 can suppress movement of the occupant 200 at the second position when the inertial force F1 acts on the occupant 200. This enables the occupant protection device 1 to prevent the occupant 200 from colliding against a structure within the vehicle 100, making it possible to protect the occupant. In addition, with the occupant protection device 1, the damper device 6 absorbs kinetic energy of the occupant 200 when the operation portion 3 suppresses movement of the occupant 200, thus reducing reaction force associated with the inertial force F1 acting on the occupant 200. This enables the occupant protection device 1 to more reliably protect the occupant 200 caught by the operation portion 3 while buffering the impact on the occupant.

Incidentally, an airbag device, which is typically used as a device for protecting an occupant, needs to be replaced once an airbag is inflated, and cannot be used continuously. Thus, the airbag device also needs to be replaced even in a case where the collision impact on a vehicle is relatively small and the vehicle can travel again once the vehicle is repaired. On the contrary, in a case of the occupant protection device 1 according to the present embodiment, the operation portion 3 can move back and forth between the first position and the second position. Thus, after the operation portion 3 has moved to the second position, the operation portion 3 can be returned to the first position, which allows repetitive use. This eliminates the need of replacing the occupant protection device 1 according to the present embodiment even after activation.

<Variation 1-1>

Next, a variation 1-1 of the movement control according to the present embodiment will be described. The present variation is characterized in that, in a case of determination that the vehicle 100 is expected to collide against an obstruction based on environment information on the vehicle 100 detected by the sensor 101, the control unit 10 performs the movement control before collision with the obstruction. The movement control according to the present variation will be described with reference to FIG. 5.

In a case where each information acquired in S101 contains information indicating that it is determined that the vehicle 100 is expected to collide against the obstruction on the basis of environment information on the vehicle 100 detected by the sensor 101, the control unit 10 makes a positive determination in S102, and in S103, performs the movement control. The environment information is information related to a collision between the vehicle 100 and an obstruction present at the periphery thereof, and examples thereof include, for example, information related to traveling and steering of the vehicle 100, relative positional information on the obstruction with respect to the vehicle 100, relative velocity information, information related to the distance between the vehicle 100 and the obstruction, and the like. For example, it can be predicted that the possibility of a collision is higher as the time to collision, which is calculated on the basis of the velocity and the separation distance of the vehicle 100, is shorter. In the present variation, the traveling control unit 103 determines a collision prediction on the basis of velocity information on the vehicle 100 serving as environment information detected by the sensor 101, the distance between the obstruction and the vehicle 100, or the like. Note that this determination may be made by the control unit 10.

The occupant protection device 1 according to the present variation performs the movement control in a case where the vehicle 100 is expected to collide against an obstruction, that is, at a state before the collision happens. This enables the occupant protection device 1 to perform the movement control before the inertial force F1 acts on the occupant 200 due to a collision of or sudden deceleration of the vehicle 100, making it possible to move the operation portion 3 to the second position before the occupant 200 starts to move frontward. With this configuration, the occupant protection device 1 can use the operation portion 3 to suppress movement of the occupant 200 during a time when the initial velocity of the occupant 200 is relatively small, making it possible to cause reaction force that the occupant 200 receives from the operation portion 3 to be relatively small. Thus, it is possible to favorably protect the occupant 200. For example, even if the collision can be avoided, it is possible to protect the occupant from hard braking of the vehicle by performing the movement control according to the present variation. After the activation, it is possible to repetitively use the occupant protection device 1 by returning the operation portion 3 to the first position.

In addition, in a case where the occupant protection device 1 is activated to move the operation portion 3 to the second position before the vehicle 100 senses sudden deceleration, even if the collision of the vehicle 100 against an obstruction is avoided, the occupant protection device 1 can be repetitively used. Thus, unlike an airbag device, no replacement is necessary.

Second Embodiment

Figure 6:
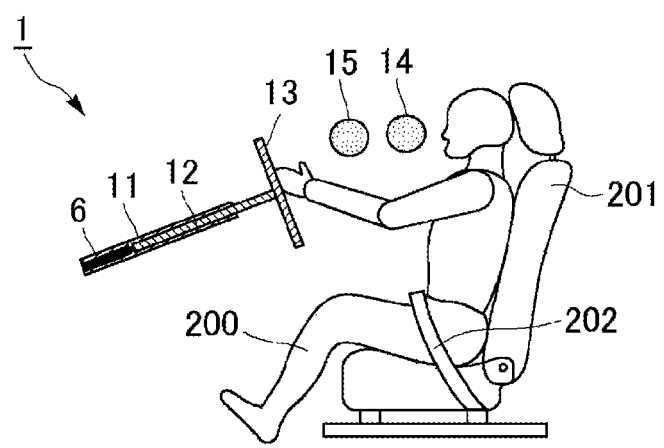
FIG. 6 is a first diagram illustrating an occupant protection device according to a second embodiment.

The occupant protection device 1 according to a second embodiment will be described. FIG. 6 is a diagram schematically illustrating a state of the occupant protection device 1 as viewed from the left side of a vehicle. The occupant protection device 1 according to the present embodiment is characterized in that a steering wheel 13 serves as the operation portion. In the present embodiment, a seat 201 is disposed at the driver's seat, and the occupant 200 is a driver of the vehicle. Note that the occupant protection device 1 according to the present embodiment also includes the control unit 10 illustrated in FIG. 4, as in the first embodiment described above.

As illustrated in FIG. 6, the occupant protection device 1 includes a steering column 11 (serving as one example of the "base portion") fixed to the vehicle. The steering column 11 is fixed to a frame serving as a structure that constitutes the vehicle. The steering column 11 extends in a manner such that the rearward side in the front-rear direction is higher, and includes a steering shaft 12 therein. The steering wheel 13 (serving as one example of the "operation portion") is fixed at a rear-side end portion of the steering shaft 12.

The steering shaft 12 can slide within the steering column 11. With the steering shaft 12 sliding, the steering wheel 13 can move back and forth between the first position and the second position. The steering wheel 13 suppresses movement of the occupant 200 when inertial force acts.

In addition, the steering wheel 13 can move back and forth between the first position serving as the initial position and the second position used to suppress movement of the occupant 200 when inertial force acts on the occupant 200. In a state illustrated in FIG. 6, the steering wheel 13 is disposed at the first position.

The occupant protection device 1 further includes the damper device 6 configured to buffer a collision impact on the occupant 200 against the steering wheel 13 when the steering wheel 13 moves to the second position. The damper device 6 is fixed at the front-side end portion of the steering column 11.

Furthermore, in the present embodiment, sensors 14 and 15 are provided at a side surface within the vehicle. The sensors 14 and 15 are disposed between a predetermined position of the occupant 200 and the steering wheel 13 at the first position with a predetermined space being given in the front-rear direction. Upon inertial force acting on the occupant 200, the upper body of the occupant 200 inclines frontward. The sensors 14 and 15 detect this movement of the occupant 200.

Figure 7:
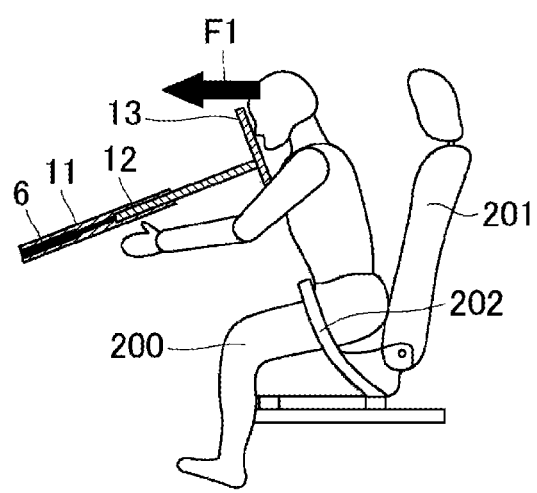
FIG. 7 is a second diagram illustrating the occupant protection device according to the second embodiment.

FIG. 7 is a schematic diagram illustrating a state where the steering wheel 13 suppresses movement of the occupant 200 at the second position when the inertial force F1 acts on the occupant 200. FIG. 7 schematically illustrates a state of the occupant protection device 1 as viewed from the left side of the vehicle.

In a case where a movement velocity of the occupant 200 toward the front direction, which is detected by the sensors 14 and 15, is equal to or more than a predetermined value, the control unit 10 of the occupant protection device 1 acquires information indicating that inertial force acts on and causes the occupant 200 to move, thus determining that the movement control is necessary (YES in step S102 in FIG. 5). Then, the control unit 10 performs the movement control that causes the steering wheel to move to the second position. For example, the control unit 10 controls a drive unit configured to include a solenoid, a motor, a hydraulic device, or the like, thus sliding the steering shaft 12 to the rear direction (toward the occupant 200 side) to move the steering wheel 13 to the second position. With this configuration, the control unit 10 performs the movement control.

Upon detecting that the inertial force F1 acts on the occupant 200 and causes the occupant to move, the occupant protection device 1 according to the present embodiment moves the steering wheel 13 to the second position, making it possible to suppress the movement of the occupant 200. In addition, the inertial force F1 acts on the occupant 200, and the occupant 200 collides against the steering wheel 13, which makes the steering wheel 13 and the steering shaft 12 slide frontward. The damper device 6 absorbs kinetic energy occurring when the steering shaft 12 slides frontward. At the time of causing kinetic energy of the occupant 200 to act on the steering shaft 12 when the steering wheel 13 catches the head or chest of the occupant 200, the damper device 6 adjusts resistance force thereof to reduce the reaction force. Note that the resistance force is resistance force acting on the steering shaft 12 when the steering shaft 12 slides. This enables the occupant protection device 1 according to the present embodiment to protect the occupant. In addition, the steering wheel 13 moves from the first position to the second position and then returns to the first position. Thus, the steering wheel 13 can repeatedly move from the first position to the second position. In the present embodiment, the steering shaft 12 is included in the steering column 11 in a manner such that the steering wheel 13 can move back and forth between the first position and the second position. Thus, the occupant protection device 1 according to the present embodiment can be repetitively used.

<Variation 2-1>

Figure 8:
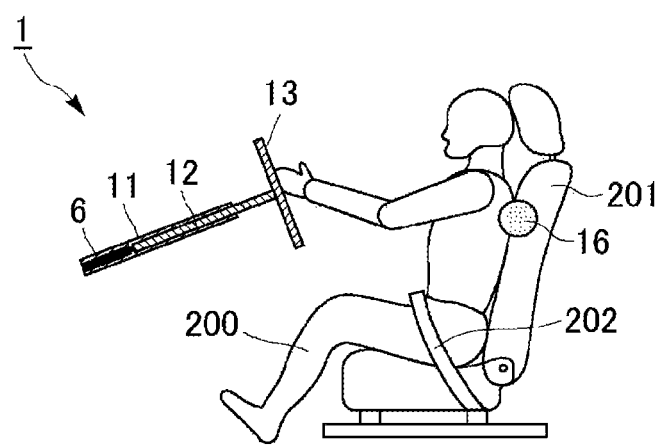
FIG. 8 is a diagram illustrating an occupant protection device according to a variation 2-1 of the second embodiment.

Next, a variation 2-1 of the movement control according to the present embodiment will be described with reference to FIG. 8. In the present variation, a sensor 16 is disposed at a seat back of the seat 201, as illustrated in FIG. 8. Upon inertial force acting on the occupant 200, the upper body of the occupant 200 inclines frontward. The sensor 16 detects this movement of the occupant 200. In a case where movement of the occupant 200 in the front direction is detected by the sensor 16, the control unit 10 of the occupant protection device 1 acquires information indicating that inertial force acts on and causes the occupant 200 to move, thus determining that the movement control is necessary (YES in step S102 in FIG. 5). Then, the control unit 10 performs the movement control that causes the steering wheel 13 to move to the second position. Upon detecting that inertial force acts on the occupant 200 and causes the occupant to move, the occupant protection device 1 according to the present variation moves the steering wheel 13 to the second position to suppress the movement of the occupant 200, making it possible to protect the occupant 200.

<Variation 2-2>

Figure 9:
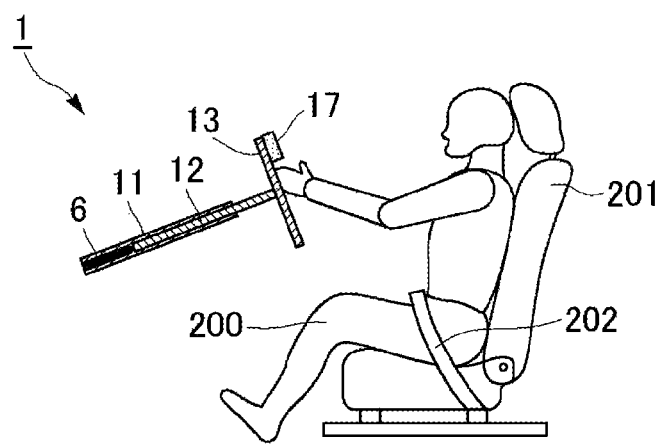
FIG. 9 is a diagram illustrating an occupant protection device according to a variation 2-2 of the second embodiment.

Next, a variation 2-2 of the movement control according to the present embodiment will be described with reference to FIG. 9. In the present variation, a sensor 17 is disposed at the steering wheel 13 as illustrated in FIG. 9. Upon inertial force acting on the occupant 200, the upper body of the occupant 200 inclines frontward. The sensor 17 detects this movement of the occupant 200. In a case where the distance between the occupant 200 and the steering wheel 13 is detected by the sensor 17 to suddenly reduce, the control unit 10 of the occupant protection device 1 acquires information indicating that inertial force acts on and causes the occupant 200 to move, thus determining that the movement control is necessary (YES in step S102 in FIG. 5). Then, the control unit 10 performs the movement control that causes the steering wheel 13 to move to the second position. Upon detecting that inertial force acts on the occupant 200 and causes the occupant to move, the occupant protection device 1 according to the present variation moves the steering wheel 13 to the second position to suppress the movement of the occupant 200, making it possible to protect the occupant 200. Note that, in the second embodiment 2 or the variations 2-1 and 2-2, the steering wheel 13 or a wheel spoke may have an impact absorbing function in order to buffer an impact on the occupant against the steering wheel 13.

Third Embodiment

Figure 10:
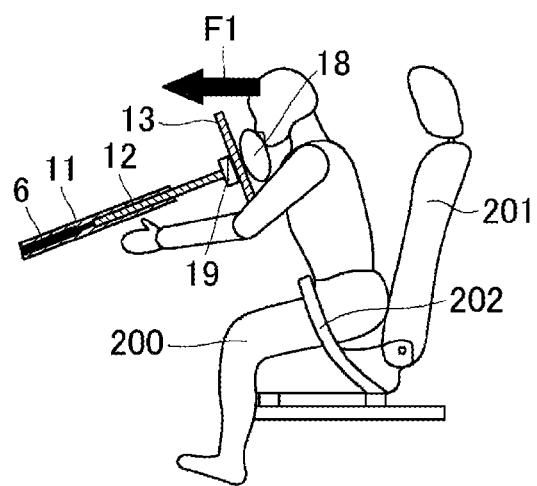
FIG. 10 is a diagram illustrating an occupant protection device according to a third embodiment.

The occupant protection device 1 according to a third embodiment will be described. FIG. 10 is a diagram schematically illustrating a state of the occupant protection device 1 as viewed from the left side of the vehicle. The occupant protection device 1 according to the present embodiment includes an airbag 18. Note that identical reference signs are attached to identical constituent elements to those of the occupant protection device 1 according to the second embodiment illustrated in FIGS. 6 and 7, and explanation thereof will not be repeated. Note that the occupant protection device 1 according to the present embodiment also includes the control unit illustrated in FIG. 4, as in the first embodiment described above.

The steering wheel 13 of the occupant protection device 1 according to the present embodiment includes the airbag 18 attached at a position that faces the occupant 200 in a case of having moved to the second position. In addition, the occupant protection device 1 includes a gas generator 19 configured to supply gas to the airbag 18. The control unit 10 of the occupant protection device 1 activates the gas generator to supply gas to the airbag 18 when the movement control of the steering wheel 13 is performed. With this configuration, the airbag 18 is inflated. With the occupant protection device 1 according to the present embodiment, the steering wheel 13 serving as one example of the operation portion can inflate the airbag 18 at the second position that is close to the occupant 200. This enables the volume of the airbag 18 to be reduced, and it is possible to reduce the size of the airbag device including the airbag 18 and the gas generator 19. In addition, with the airbag 18, it is possible to buffer the collision impact on the occupant 200 when the steering wheel 13 suppresses the movement of the occupant 200. Note that a known device can be used for the airbag device.

Note that, in a case where the distance between the steering wheel 13 and the occupant 200 is less than a predetermined distance at the second position, the control unit 10 of the occupant protection device 1 may not activate the gas generator 19 at the time of performing the movement control described above. In a case where the distance between the steering wheel 13 and the occupant 200 is less than the predetermined distance and, for example, the head of the occupant 200 is close to the steering wheel 13, it is expected that the occupant 200 is in danger if the airbag 18 is inflated. In such a case, the occupant protection device 1 according to the present embodiment is configured such that the airbag 18 is not inflated, making it possible to appropriately protect the occupant 200. Note that the distance between the steering wheel 13 and the occupant 200 can be detected, for example, by using the sensor 17 illustrated in FIG. 9.

Fourth Embodiment

Figure 11:
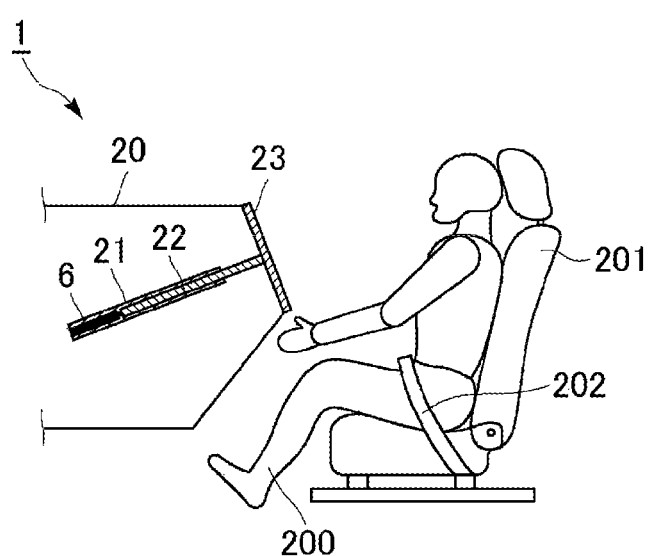
FIG. 11 is a first diagram illustrating an occupant protection device according to a fourth embodiment.

The occupant protection device 1 according to a fourth embodiment will be described. FIG. 11 is a diagram schematically illustrating a state of the occupant protection device 1 as viewed from the left side of the vehicle. The occupant protection device 1 according to the present embodiment is characterized in that a front surface panel 23 of a dashboard 20 serves as the operation portion. In the present embodiment, the seat 201 is disposed at a front passenger seat. Note that the occupant protection device 1 according to the present embodiment also includes the control unit illustrated in FIG. 4, as in the first embodiment described above.

As illustrated in FIG. 11, the occupant protection device 1 includes a bearing 21 (serving as one example of the "base portion") fixed to the vehicle. The bearing 21 is fixed to a frame serving as a structure that constitutes the vehicle. The bearing 21 extends in a manner such that the rearward side in the front-rear direction is higher, and includes a shaft 22 therein. The front surface panel 23 (serving as one example of the "operation portion") is fixed at the rear-side end portion of the shaft 22.

The shaft 22 can slide within the bearing 21. With the shaft 22 sliding, the front surface panel 23 can move back and forth between the first position and the second position. The front surface panel 23 suppresses movement of the occupant 200 when inertial force acts.

In addition, the front surface panel 23 can move back and forth between the first position serving as the initial position and the second position used to suppress movement of the occupant 200 when inertial force acts on the occupant 200. In a state illustrated in FIG. 11, the front surface panel 23 is disposed at the first position.

The occupant protection device 1 further includes the damper device 6 configured to buffer a collision impact on the occupant 200 against the front surface panel 23 when the shaft 22 moves to the second position. The damper device 6 is fixed at the front-side end portion of the steering column.

Figure 12:
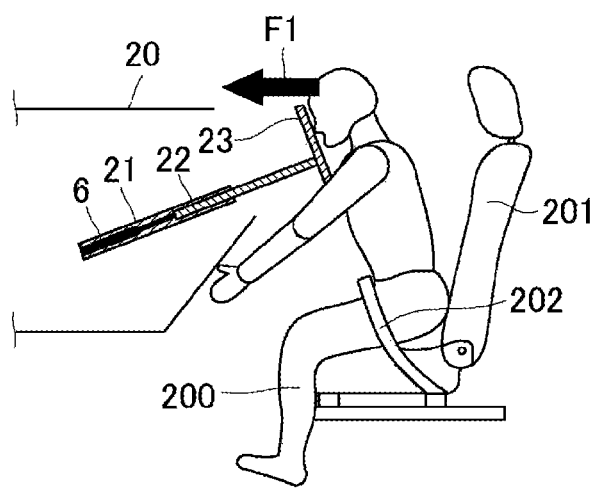
FIG. 12 is a second diagram illustrating the occupant protection device according to the fourth embodiment.

FIG. 12 is a schematic diagram illustrating a state where the front surface panel 23 suppresses movement of the occupant 200 at the second position when the inertial force F1 acts on the occupant 200. FIG. 12 schematically illustrates a state of the occupant protection device 1 as viewed from the left side of the vehicle. Note that the movement control by the control unit 10 of the occupant protection device 1 according to the present embodiment can be performed in a manner similar to that in the second embodiment and the variations 2-1 and 2-2 described above.

Upon detecting that inertial force F1 acts on the occupant 200 and causes the occupant to move, the occupant protection device 1 according to the present embodiment moves the front surface panel 23 to the second position, making it possible to suppress the movement of the occupant 200. In addition, the inertial force F1 acts on the occupant 200, and the occupant 200 collides against the front surface panel 23 to slide the front surface panel 23 and the shaft 22 frontward. The damper device 6 absorbs kinetic energy occurring when the shaft 22 slides frontward. At the time of causing kinetic energy of the occupant 200 to act on the shaft 22 when the front surface panel 23 catches the head of the occupant 200, the damper device 6 adjusts resistance force thereof to reduce the reaction force. Note that the resistance force is resistance force acting on the shaft 22 when the shaft 22 slides. This enables the occupant protection device 1 according to the present embodiment to protect the occupant. In addition, the front surface panel 23 moves from the first position to the second position and then returns to the first position. Thus, the front surface panel 23 can repeatedly move from the first position to the second position. In the present embodiment, the shaft 22 is included in the bearing 21 in a manner such that the front surface panel 23 can move back and forth between the first position and the second position. Thus, the occupant protection device 1 according to the present embodiment can be repetitively used.

In the embodiment described above, the control unit 10 may control, by the damper device 6, adjustment of the reaction force in accordance with a velocity of the vehicle or a weight of the occupant 200, or in accordance with a velocity of the occupant 200 toward the operation portion 3 in a case where the inertial force acts. Note that the weight of the occupant can be detected by using a load sensor disposed at the seat 201. For example, in a case where the velocity of the vehicle is relatively large or in a case where the weight of the occupant 200 is relatively large, the inertial force acting on the occupant 200 is also large. This leads to an increase in the reaction force acting on the occupant 200 that the damper device 6 intends to reduce. For example, by using a damper device 6 that can adjust the damping force with a magnetic coil, the control unit 10 can control adjustment of the reaction force with the damper device 6.

In addition, the occupant protection device 1 according to the first embodiment, the second embodiment, and the fourth embodiment described above may include the airbag 18 illustrated in FIG. 10. The airbag 18 is disposed at the operation portion according to each of the embodiments. Note that the gas generator 19 may employ a gas generator that can be repetitively used by, after activation, injecting compressed air again or replacing a cartridge containing a gas generation agent.

Furthermore, the buffering means in the occupant protection device 1 is not limited to the damper device 6. For example, it may be possible to use an elastic member such as a spring or linear motor or the like as the buffering means. In addition, in a case where a gas from the gas generator is used to drive the operation portion to the second position, it may employ a configuration in which an orifice for emitting a gas after activation of the gas generator is provided, and the reaction force acting on the occupant is adjusted with the volume of the gas emitted from this orifice. Note that, in the first embodiment described above, the reaction force may be adjusted by using a frictional force generated when the slide portions 4a and 4b slide at the left side base 2a and the right side base 2b to convert kinetic energy of the occupant 200 into heat generated at the slide portions 4a and 4b, the left side base 2a, and the right side base 2b. In a similar manner, in the second and third embodiments, the reaction force may be adjusted by using a frictional force generated when the steering shaft 12 slides within the steering column 11 to convert kinetic energy of the occupant 200 into heat generated at the steering shaft 12 and the steering column 11. In a similar manner, in the fourth embodiment, the reaction force may be adjusted by using a frictional force generated when the shaft 22 slides within the bearing 21 to convert kinetic energy of the occupant 200 into heat generated at the shaft 22 and the bearing 21.

Furthermore, in a case where the velocity of the vehicle 100 is less than a predetermined velocity, the occupant protection device 1 may not perform the movement control described above. This is because, in a case where the velocity of the vehicle 100 is less than a predetermined velocity, the occupant 100 is safe, in some cases, if the operation portion 3 is not moved to the second position. Note that the control unit 10 can acquire the velocity of the vehicle 100 from the traveling control unit 103.

Note that the occupant protection device 1 may include a motor used to move the operation portion 3 from the second position to the first position. This makes it possible to eliminate the workload of the occupant 200 in putting the operation portion 3 back to the first position after the occupant protection device 1 is activated.

Note that, with the occupant protection device 1 according to the embodiments and the variations described above, it is possible to protect the occupant 200 regardless of whether the seatbelt 202 is used or not.

Each embodiment disclosed in the present specification can be combined with each of the features disclosed in the present specification.

REFERENCE SIGNS LIST

1 Occupant protection device
2 Base portion
3 Operation portion
4a, 4b Slide portion
5 Hinge
6 Damper device
10 Control unit
11 Steering column
12 Steering shaft
13 Steering wheel
14, 15, 16, 17 Sensor
18 Airbag
19 Gas generator
20 Dashboard
21 Bearing
22 Shaft
23 Front surface panel
100 Vehicle
101 Sensor
102 Position information acquiring unit
103 Traveling control unit
104 Traveling drive unit
200 Occupant
201 Seat
202 Seatbelt

The invention claimed is:

1. An occupant protection device that protects an occupant boarding on a vehicle, the occupant protection device comprising:
 a base portion fixed to the vehicle;
 an operation portion connected to the base portion and configured to move back and forth between a first position serving as an initial position and a second position used to suppress movement of the occupant when inertial force acts on the occupant, wherein the operation portion comprises an airbag attached at a position that is configured to face the occupant in a case of having moved to the second position;
 a gas generator configured to supply gas to the airbag; and
 a control unit configured to activate the gas generator to supply gas to the airbag to perform movement control to move the operation portion from the first position to the second position, wherein the operation portion is movable repeatedly from the first position to the second position through the movement control by returning to the first position after having moved from the first position to the second position,
 wherein the occupant protection device further includes a buffering means configured to buffer a collision impact on the occupant against the operation portion when the operation portion moves to the second position; and
 wherein in a case where the control unit determines a distance between the operation portion at the second position and the occupant is less than a predetermined distance, the control unit does not activate the gas generator at the time of performing the movement control.

2. The occupant protection device according to claim 1, wherein
 the control unit is configured to perform the movement control in a case of acquiring information indicating that the vehicle suddenly decelerates or the inertial force acts on the occupant to detect a movement of the occupant.

3. The occupant protection device according to claim 2, wherein
 the operation portion is configured to catch a part of a body of the occupant at the second position to suppress the movement of the occupant, and the buffering means is configured to reduce reaction force associated with the inertial force acting on the occupant.

4. The occupant protection device according to claim 3, wherein the operation portion is configured to catch a part of a body of the occupant at the second position to suppress the movement of the occupant, and the buffering means is configured to reduce reaction force associated with the inertial force acting on the occupant.

5. The occupant protection device according to claim 1, wherein in a case of determination that the vehicle is expected to collide against an obstruction, based on environment information on the vehicle detected by a sensor mounted at the vehicle, the control unit performs the movement control before collision against the obstruction.

6. The occupant protection device according to claim 1, wherein the operation portion is configured to catch a part of a body of the occupant at the second position to suppress the movement of the occupant, and when the operation portion catches the part of the body of the occupant, the buffering means is configured to reduce reaction force associated with the inertial force acting on the occupant.

7. The occupant protection device according to claim 6, wherein the control unit is configured to control adjustment of the reaction force by the buffering means, in accordance with a velocity of the vehicle, a weight of the occupant, or in accordance with a velocity of the occupant toward the operation portion in a case where the inertial force acts.

8. The occupant protection device according to claim 7, wherein in a case of determination that the vehicle is expected to collide against an obstruction, based on environment information on the vehicle detected by a sensor mounted at the vehicle, the control unit performs the movement control before collision against the obstruction.

9. The occupant protection device according to claim 6, wherein in a case of determination that the vehicle is expected to collide against an obstruction, based on environment information on the vehicle detected by a sensor mounted at the vehicle, the control unit performs the movement control before collision against the obstruction.

10. The occupant protection device according to claim 1, wherein in a case of determination that the vehicle is expected to collide against an obstruction, based on environment information on the vehicle detected by a sensor mounted at the vehicle, the control unit performs the movement control before collision against the obstruction.

\* \* \* \* \*